(12) United States Patent
Helmenstein

(10) Patent No.: US 8,505,785 B2
(45) Date of Patent: Aug. 13, 2013

(54) CARTRIDGE PISTON

(75) Inventor: Achim Helmenstein, Engelskirchen (DE)

(73) Assignee: Fischbach KG Kunststoff Technik, Engelskirchen (DE)

( * ) Notice: Subject to any disclaimer, the term of this patent is extended or adjusted under 35 U.S.C. 154(b) by 226 days.

(21) Appl. No.: 12/956,671

(22) Filed: Nov. 30, 2010

(65) Prior Publication Data
US 2011/0309111 A1 Dec. 22, 2011

(30) Foreign Application Priority Data

Jun. 22, 2010 (DE) .......... 10 2010 024 615
Oct. 12, 2010 (DE) .......... 10 2010 048 062

(51) Int. Cl.
*B65D 88/54* (2006.01)
(52) U.S. Cl.
USPC ............ 222/326; 222/327; 222/386; 222/387
(58) Field of Classification Search
USPC .................. 222/326, 327, 386, 387, 389–392
See application file for complete search history.

(56) References Cited

U.S. PATENT DOCUMENTS

| | | | | |
|---|---|---|---|---|
| 4,134,523 A | * | 1/1979 | Hansen et al. ................ | 222/389 |
| 4,854,485 A | * | 8/1989 | Collins ......................... | 222/386 |
| 5,242,091 A | * | 9/1993 | Ishida et al. .................. | 222/386 |
| 5,360,146 A | * | 11/1994 | Ikushima ...................... | 222/386 |
| 5,385,274 A | * | 1/1995 | Twyman ....................... | 222/327 |
| 5,628,433 A | * | 5/1997 | Binder ......................... | 222/327 |
| 5,749,499 A | * | 5/1998 | Binder ......................... | 222/327 |
| 6,409,053 B2 | * | 6/2002 | Stossel ......................... | 222/386 |
| 6,712,245 B2 | * | 3/2004 | Barrett ......................... | 222/386 |
| 2001/0007328 A1 | * | 7/2001 | Stossel ......................... | 222/386 |

FOREIGN PATENT DOCUMENTS

| | | |
|---|---|---|
| EP | 1845033 A1 | 10/2007 |
| EP | 2108599 A1 | 10/2009 |
| GB | 2259738 A | 3/1993 |

OTHER PUBLICATIONS

European search report dated Aug. 31, 2011 from corresponding European Patent Application No. 11 168 978.2.

* cited by examiner

*Primary Examiner* — Kevin P Shaver
*Assistant Examiner* — Daniel R Shearer
(74) *Attorney, Agent, or Firm* — Maier & Maier PLLC

(57) ABSTRACT

A cartridge piston for pressing out a compound from a cartridge body is provided with a forwardly directed, elastic sealing lip which is arranged to bear against the cartridge wall. To allow for escape of air while the piston is being introduced, air passages are provided on the sealing lip. In a wall portion of the side wall, the piston has a non-circular shape so that, in certain regions, the abutment of the piston on the cartridge wall is less close than in other regions. In this manner, the outflow of air to the outside is facilitated. Further, the piston is arranged in its inserted state in a sealing abutment on the cartridge wall, thus precluding ingress of air into the cartridge.

15 Claims, 5 Drawing Sheets

CARTRIDGE PISTON

RELATED APPLICATIONS

This application is the U.S. national stage application which claims priority under 35 U.S.C. §119 to German Patent Application No.: 10 2010 024 615.8, filed on Jun. 22, 2010, and to German Patent Application No.: 10 2010 048 062.2, filed on Oct. 12, 2010, the disclosures of which are incorporated by reference herein their entireties.

BACKGROUND OF THE INVENTION

1. Field of the Invention

The present invention relates to a cartridge piston comprising a surrounding side wall and being closed at its front end by a piston end face, said side wall being provided with at least one flexible sealing lip. Further, the invention relates to a combination of a cartridge piston and a cartridge.

2. Description of the Prior Art

Cartridges for compounds to be dispensed by being pressed out, such as compounds for sealing and filling purposes, consist of a tubular cartridge body into which the compound will be filled. Said cartridge body is closed on its front end, and the process of filling the compound into the cartridge body will be performed via the open rear end. Then, likewise from the rear end, the piston will be introduced into the cartridge body for sealing closure of the latter.

A cartridge piston of the type forming the basis of claim 1 is described in EP 1 845 033 A1 (Fischbach). The piston is provided with two flexible sealing lips adapted to sweep along the wall of the cartridge body so that the space containing the dispensable compound is sealed against the environment. A front sealing lip is formed with recesses allowing for release of air while the piston is being introduced, i.e. during insertion of the piston into the cartridge. On the rear sealing lip, discontinuities are formed, thus preventing a full-faced abutment of the rear lip on the inner surface of the cartridge. Said discontinuities allow for the escape of air via the rear sealing lip.

The process of applying the piston is performed in a machine at a relatively high speed. As a result, a temporarily increased pressure will be generated in the space in front of the piston end face, and this pressure has to be discharged by allowing it to move past the sealing lip, along the side wall of the piston and finally into the ambient air. A problem herein resides in that this airway offers a high flow resistance because said discontinuities leave open only a small cross-sectional area of the opening. This has the adverse effect that, in the further course of the airway on the side wall of the piston, there will not be available sufficient pressure for discharging the air. On the side wall of the piston, raised surrounding rings are formed which are in abutment with the inner wall of the cartridge and which cannot be overcome by the weak airflow. As a result, a part of the air in the region of the piston will remain entrapped within the cartridge on the outer side of the piston or also in front of the piston end face. In case that the above discontinuities are less prominent, it is also possible to insert the piston obliquely into the cartridge and to allow the air to flow past the sealing lip. Also in this case, however, the abutment of the side wall of the piston on the inner wall of the cartridge will cause a reduction of the air discharge flow. Under the influence of the resultant residual air in front of the piston, the dispensable compound will tend to harden in the cartridge and thus to become spoiled. Further, during the process of pressing the compound out of the cartridge, air bubbles in front of the piston end face will cause undesired interruptions of the pressed-out strand of filling material.

It is an object of the invention to provide a cartridge piston of the initially mentioned type which allows for an improved release of air when the piston is being introduced.

SUMMARY OF THE INVENTION

The cartridge piston according to the invention is defined by claim 1. According to the invention, the side wall can comprise, e.g. at its rear end, a non-circular wall portion whose radiant as defined relative to the longitudinal central axis comprises variations in the circumferential direction.

Said radiant is a ray arranged within a plane extending vertically to the longitudinal central axis, which ray starts at the longitudinal central axis and terminates at the wall portion of the piston. The amount of the radiant is the length of this ray. On those portions of the circumference where the radiant is small, the air which is displaced during introduction of the piston will sweep along more easily than on the portions where the radiant is large. Thus, longitudinal airways are generated which offer a reduced aerodynamic resistance. The non-circular shape of said wall portion of the side wall has the effect that, in certain regions of the circumference, the outer surface of the piston is larger than the inner surface of the cartridge body, while being smaller in other regions. On average, the outer diameter of the piston is larger than the inner diameter of the cartridge body. It is thereby achieved that, in the stationary state which is reached at the end of the applying process, a displacement of material will have led to an equalization along the circumference of the piston in the sense that, after a transition period, the piston will throughout its circumference be in biased abutment on the cartridge wall. In this state, the circumference of the piston and the inner circumference of the cartridge are snugly bearing against each other. In this manner, it is guaranteed that no air can enter the cartridge during the storage period.

With preference, it is provided that said non-circular wall portion is at least partially formed by a surrounding edge.

Preferably, the non-circular edge has the same wall thickness at all sites in the circumferential direction. This also leads to avoidance of longitudinal grooves which might allow an ingress of air into the interior of the cartridge.

The invention makes it possible to provide small air passages on the flexible sealing lip. Such small air passages allow for a throughflow of air but will substantially hold back the dispensable compound, so that the compound cannot overcome the sealing lip. The narrow air passages have the disadvantageous side effect of decelerating the air flow and thus hindering a sufficiently fast outflow of the air from the cartridge past the rear piston wall which is arranged in elastic abutment on the inner wall of the cartridge. Due to non-circular shape of the piston wall, this negative effect is temporarily eliminated in that, for a brief time, a gap will be formed between the piston inner wall and the cartridge wall. An essential advantage herein resides in that the piston can also be applied at high speed without entailing the risk that the dispensable compound might escape past the piston to the outside, and without the risk of air inclusion occurring in the space in front of the piston.

According to a preferred embodiment of the invention, a protective edge, which is relatively rigid as compared to the sealing lip and comprises at least one cutout, is arranged on the piston in front of the sealing lip. Said protective edge serves as a sort of shield for mechanical protection of the sensitive sealing lip. It is arranged at an axial distance from the sealing lip. In case that a plurality of cutouts are provided, these form large passage areas which during the introduction of the piston are used for guiding the escaping air past the protective edge. In their totality, the air passages on the sealing lip have a flow resistance larger than that of said cutouts. Thereby, it is effected that the dispensable compound will be allowed to pass the cutouts of the protective edge but not the smaller air passages. The movement of the compound along the piston will thus end on the sealing lip.

According to a further preferred embodiment, at least some of the cutouts in the protective edge are circumferentially offset relative to the air passages in the sealing lip so that, at these sites, the protective edge also functions to protect the air passages of the sealing lip. The compound will first flow through the cutouts of the protective edge, will subsequently flow around the protective edge and will finally flow to the air passages of the sealing lip. Assuming that the compound would flow to the air passages of the sealing lip already earlier when the bulk of the trapped air has not yet escaped from the region in front of the piston, the compound would close the air passages of the sealing lip too early, and residual air would remain in front of the piston end face.

The air passages of the sealing lip can be holes in the sealing lip or recesses on the free end of the sealing lip. According to a preferred embodiment of the invention, said passages are provided as non-beaded regions in an otherwise beaded edge at the end of the sealing lip. While the beaded edge is in sealing abutment on the cartridge wall, said non-beaded regions can be passed by the air.

The non-circular wall portion of the side wall can have the shape of a polygon. A polygon in the context of the present invention is defined as having several (two or more) corners, these corners being rounded. In principle, also a version with only just one corner would be possible.

The side wall can comprise surrounding rings raised toward the outside. These rings prevent a large-surfaced abutment of the side wall on the inner wall of a cartridge body into which the cartridge piston has been inserted. Said raised surrounding rings can be formed as flexible lips. These flexible lips will bear against the round shape of the cartridge in a particularly advantageous manner.

According to a particularly preferred embodiment, it is provided that said raised surrounding rings are formed on said non-circular wall portion. Especially if, in a cartridge piston according to this embodiment of the invention, the raised rings are formed as flexible lips, the cartridge piston will adapt to the round shape of the cartridge in an especially advantageous manner while, at the same time, a large-surfaced abutment of the side wall on the inner wall of the cartridge body will be prevented.

In this embodiment of the invention, it can be provided that the cartridge piston is at least partially made of polyamide or polyolefin, preferably polyethylene or polypropylene. Thus, the invention provides that the tubular piston body, the piston end face, the side wall and/or the flexible sealing lip are made of one of said materials. Particularly the use of soft polyethylene is of advantage because this material is more flexible than the raw material normally used in cartridges. For this reason, the cartridge piston will bear against the surface of the cartridge in an advantageous fashion and provide a good sealing effect. Thus, the cartridge piston can consist completely or partially of said materials.

The invention further relates to a combination of a cartridge piston which comprises a non-circular wall portion, and a cartridge having a circular inner cross section. According to the invention, it can be further provided that the radiant of the outer circumference of the non-circular wall portion of the piston is at some sites larger and at other sites smaller than the radius of the inner circumference of the cartridge. Thereby, it is accomplished that, during the applying of the piston which will take a merely brief time, the piston will not be sealed towards the cartridge wall, thus allowing air to escape past it. Thereafter, under the constraining effect of the cartridge, the cartridge piston will be deformed to fill out the inner circumference of the cartridge with sealing and fitting effect.

The invention further relates to a cartridge piston comprising a tubular piston body which has a surrounding side wall and is closed at its front end by a piston end face, wherein the side face is provided with at least one flexible sealing lip which preferably has air passages in it. In front of said at least one sealing lip of this piston, a protective edge is provided which in comparison to the sealing lip is relatively stiff, and which at least partially covers the sealing lip in the axial direction, said protective edge being provided with cutouts which at least partially are arranged at a circumferential offset relative to the air passages of the sealing lip.

In the above arrangement, it can be provided that said cutouts in their totality have a lower flow resistance than the totality of said air passages. Thereby, it is achieved that, during the applying of the piston, i.e. when inserting the piston into the cartridge filled with plastically formable compound, the escape of air is facilitated. The air will escape first via the cutouts while, at the same time, also a part of the plastically formable compound may proceed behind the protective edge. The flow resistance of the totality of the air passages on or in the sealing lip is higher so that these air passages can be passed only by escaping air but not by any compound. The cutouts will merely decelerate the compound, and the air passages—due to the higher flow resistance—will prevent the compound from advancing into the region outside the piston.

According to the invention, it can be provided that the protective edge has a maximum diameter smaller than or equal to the maximum diameter of the sealing lip.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
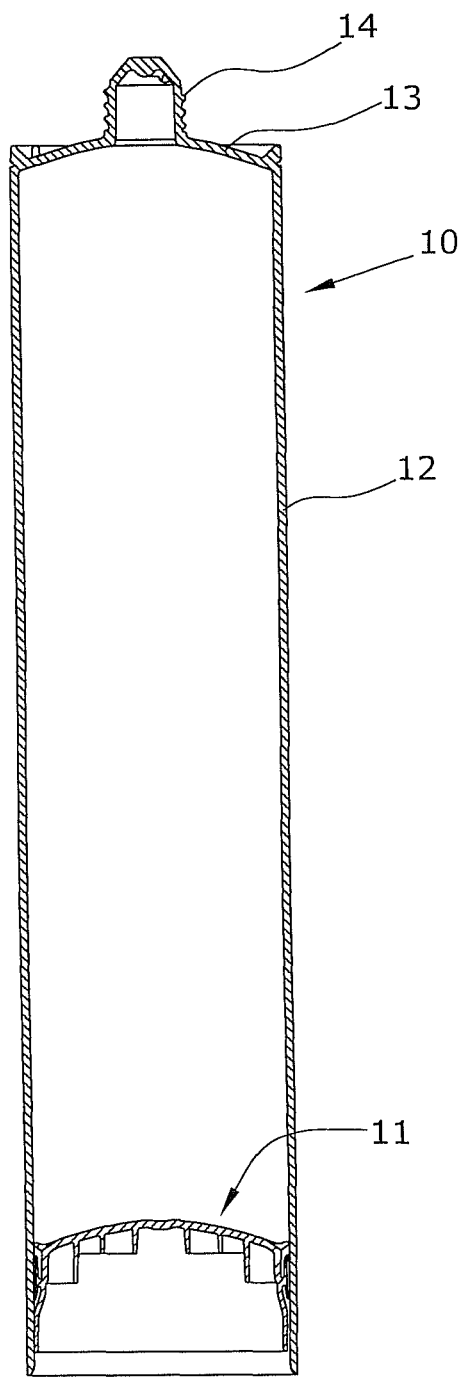
FIG. 1 is a longitudinal sectional view of a cartridge with a cartridge piston arranged therein.
Figure 2:
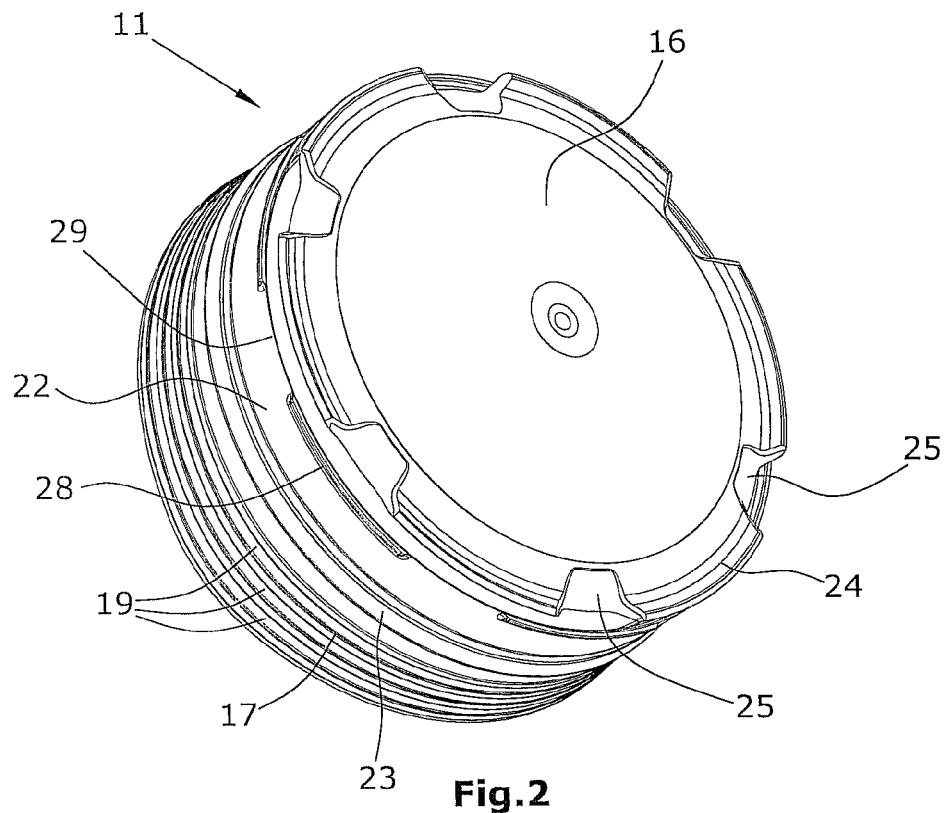
FIG. 2 is a perspective view of the piston seen obliquely from the front.
Figure 3:
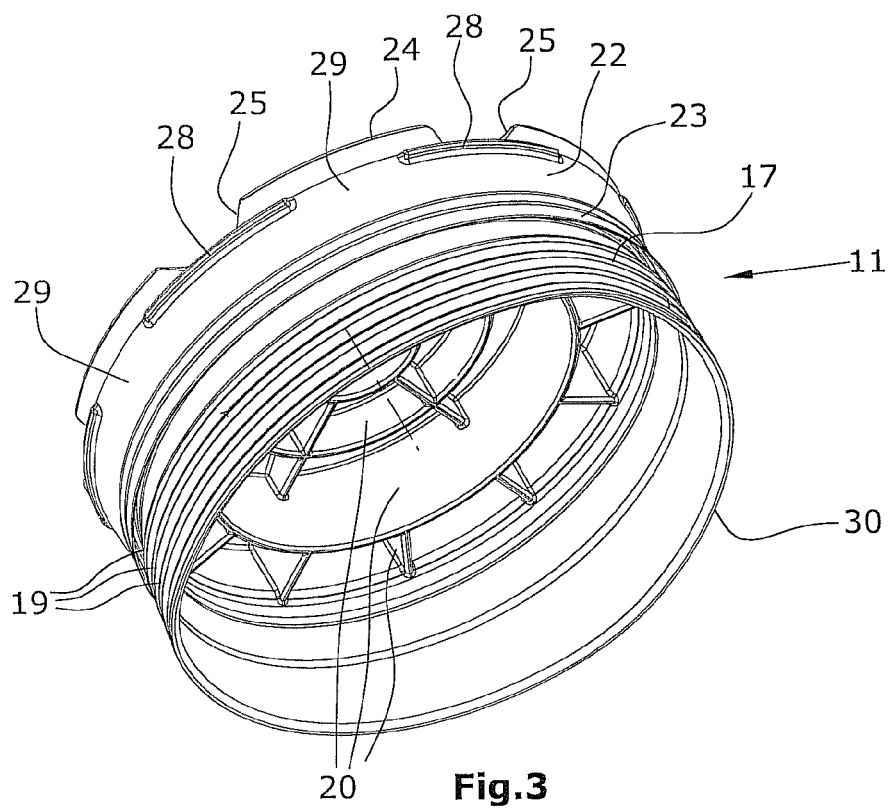
FIG. 3 is a perspective view of the piston seen obliquely from the rear.

FIG. 1 shows the whole cartridge comprising a one-pieced cartridge body 10 and a likewise one-pieced piston 11. Said cartridge body 10 comprises a cylindrical casing 12 being closed at one end by an end wall 13 provided with a detachable discharge spout 14. Said piston 11 is inserted into the open end of cartridge body 10. First, cartridge body 10 will have to be filled with the dispensable compound (not shown) and, thereafter, piston 11 will be introduced into the rear end of the cartridge body.

Piston 11 comprises a piston end face 16 arranged at the front, and a surrounding side wall 17. Said piston end face 16 forms the front end wall of the piston. Said side wall 17 is provided, on its outer side, with protruding surrounding rings 19 which in the present example have a slightly sawtooth-like shape. Said protruding surrounding rings 19 can also be formed as flexible lips, for instance. Said rings are effective to prevent a large-surfaced abutment of the side wall 17 to the inner wall of cartridge body 10.

The interior of piston 11 is hollow. Starting from the rear side of piston end face 16, ribs 20 extend in the rearward direction. The rear ends of said ribs 20 serve as engagement surfaces for pressing engagement by the plate of a press-out tool (not shown) which, during the press-out process, will advance the piston within the cartridge body.

Figure 5:
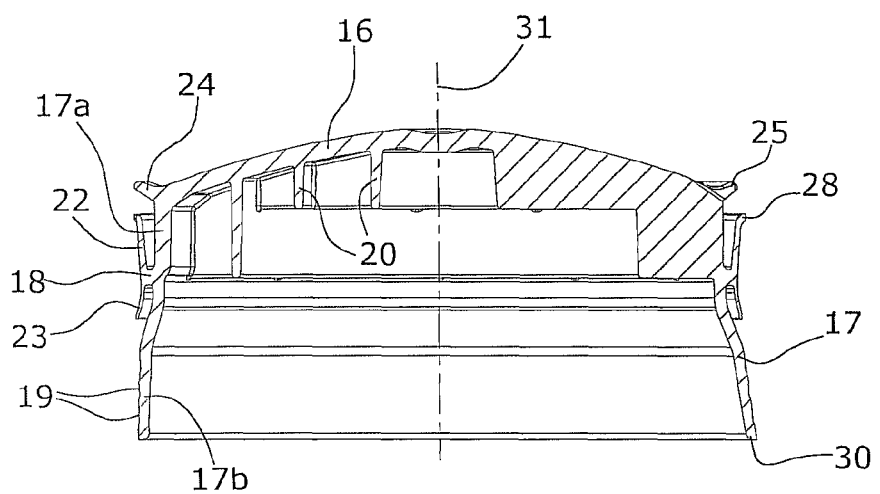
FIG. 5 is a sectional view taken along the line V-V in FIG. 4.
Figure 6:
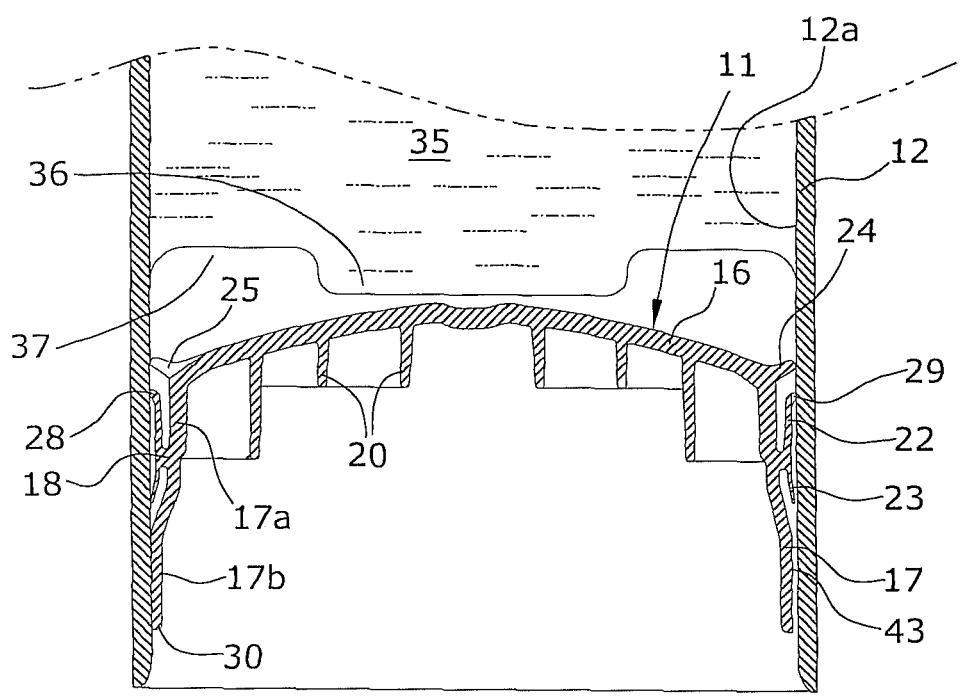
FIG. 6 is a longitudinal sectional view of the cartridge piston within the cartridge during the introduction process.

As depicted in FIGS. 5 and 6, side wall 17 comprises a front portion 17a joining the piston end face 16, and a rear portion 17b. The outer diameter of front portion 17a is smaller than that of rear portion 17b. Projecting from front portion 17a is a circumferential web 18 carrying a front sealing lip 22 pointing in the forward direction, and a rear sealing lip 23. Said front sealing lip 22 extends from circumferential web 18 towards the front, and said rear sealing lip 23 extends from circumferential web towards the rear. The function of the front sealing lip 22 resides in sealing the circumferential gap between the cartridge and the cartridge body at the end of the introduction process and during the press-out process. Rear sealing lip 23 can serve as a sealing barrier against pressurized air which, in case of a pneumatic press-out tool, is used for advancing the piston. Said rear portion 17b serves for abutment on the cartridge wall. For this reason, it is provided with said rings 19. The wall thickness of sealing lips 22 and 23 is considerably smaller than that of the other wall portions of the piston, thus rendering the sealing lips flexible or elastic.

In the transition region between piston end face 16 and side wall 17, an annular protective edge 24 is arranged, extending from the front end of side wall 17 obliquely outward to the front. Said protective edge 24 is relatively thick and rigid. The protective edge serves for protection of the sealing lips 22,23 which, when viewed in projection, are partially covered by it. The protective edge has relatively wide and large cutouts 25 formed in it, allowing for passage of air and of filling material past the protective edge.

The outer end of sealing lip 22 is provided with a surrounding bead edge 28 projecting to the outside. At certain portions of the circumference, said bead edge 28 is interrupted or absent. These portions form air passages 29. The cutouts 25 of protective edge 24 are circumferentially offset relative to said air passages 29 of sealing lip 22.

Rear portion 17b of side wall 17 has a constant thickness along its circumference. Also in the longitudinal direction, portion 17b has a substantially constant thickness, except for the surrounding rings 19. On the rear end of portion 17b, a surrounding edge 30 is arranged. As shown in FIG. 5, one wall portion of side wall 17 is not shaped with rotational symmetry to the longitudinal central axis 31 of the piston. Instead, the wall portion has a circumferentially varying radiant relative to the longitudinal central axis so that the wall portion has a non-circular shape. The non-circular shape does not extend to the front portion 17a which is circular. In the illustrated embodiment, said non-circular portion is formed by a part of portion 17b and said surrounding edge 30.

Figure 4:
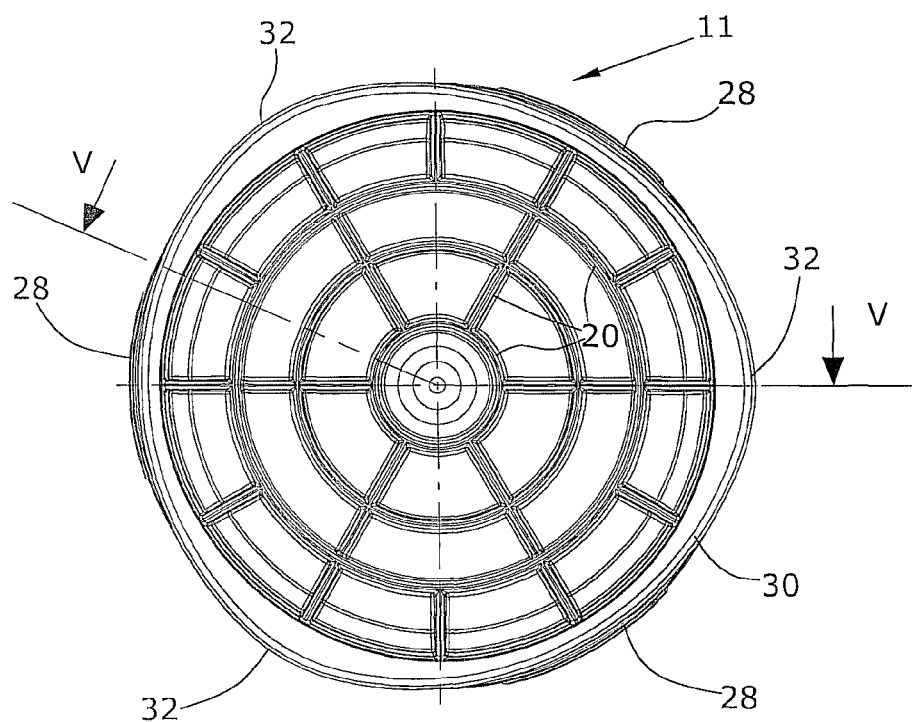
FIG. 4 is a rear view of the piston.

In FIG. 4, it can be seen that, at the rear end of the piston, the non-circular edge 30 is polygonal with rounded corners 32. In the present case, the edge has a triangular contour. The radiant of the edge is largest at the corners, while being smaller between the edges.

FIG. 6 illustrates the insertion of piston 11 into cartridge body 10 whose inner wall 12a is cylindrical, i.e. has a constant diameter. Arranged within the cartridge is the dispensable compound 35, its rear end face forming a central dome 36 surrounded by an annular trough 37. First, the piston 11 will press—by its piston end face 16—against said dome 36. The compound will then be distributed laterally to the outside. The compound will be pressed through the cutouts 25 of the protective edge 24 and, while displacing the air, will fill out the hollow space between the portion 17a of side wall 17 and the sealing lip 22. The escaping air will flow through the air passages 29 and then, further, along the side wall to the outside. The air passages 29 have a small total cross section and thus cannot be passed by the flowable mass. Consequently, the air passages offer a high flow resistance also to the air, thus preventing build-up of a pressure by which the gap between the rear portion 17b and the cartridge wall could be overcome.

For this reason, the non-circular shape of the wall portion is provided in the form of said edge 30 and respectively of said rear portion 17b of the piston. This non-circular shape pertains to the piston in its relaxed state while the piston is not subjected to external forces or constraints.

Figure 7:
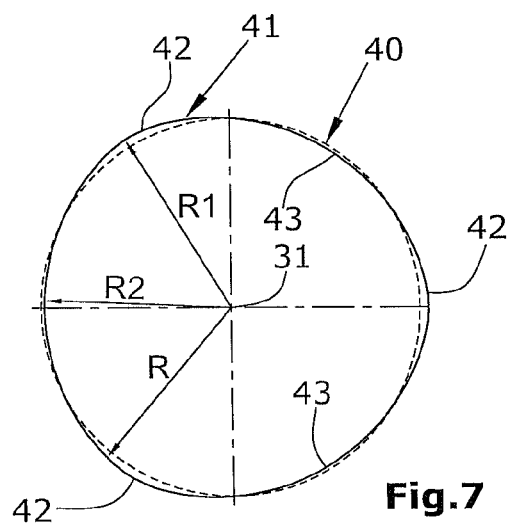
FIG. 7 is a schematic view illustrating the ratios between the inner surface of the cartridge body and the outer surface of the piston in case of a triangular polygonal structure of the piston.

The non-circular shape is illustrated in FIG. 7. In this Figure, the interior circle of cartridge body 10 is designated by reference numeral 40. This interior circle is exactly circular, i.e. it has the same radius at all sites of the circumference. Designated by 41 is the outer contour of the wall portion of side wall 17 of piston 11. This outer contour is non-circular. Its radiant R is at certain sites larger (radiant R1) and at other sites smaller (radiant R2) than the radius of the interior circle 40. In the present embodiment, the contour 41 forms a polygon whose three corners 42 are rounded. Said corners 42 are interconnected by regions 43 of smaller radial distances. The radii at the corners 42 and the radii of said regions 43 can be selected to the effect that the unwound length of said contour 41 is slightly oversized relative to the unwound length of interior circle 40. Since the piston is made of plastic and has a certain elasticity, it will adapt to the cartridge during and after insertion of the piston into the cartridge body. During insertion and respectively advancement of the piston, the pressure exerted by the piston against the cartridge wall will first be smaller in the regions 43 than in the corner regions. Upon insertion into the cartridge, it will take some time for the piston to assume a circular shape. Once this has occurred, the piston will be safely sealed against the cartridge wall. During the adjustment period of the piston, the press-on force toward the cartridge wall will be smaller in the regions 43 so that, in these regions, the displaced air can flow off more easily, as illustrated on the right-hand side in FIG. 6. Thus, the air displaced by the piston will first stream through the cutouts 25 of protective edge 24 and then through the air passages 29 of sealing lip 22, to finally escape along said regions 43 into the ambience.

The invention offers the advantage that, along said regions 43, outflow channels will be generated only during the initial phase of the inserting of the piston into the cartridge. In the stationary state, i.e. when the piston has been inserted into the cartridge, the rear portion 17b of the piston will provide a reliable sealing effect against the cartridge body, thus preventing intrusion of gases into the cartridge or leakage of gases out of the cartridge.

Figure 8:
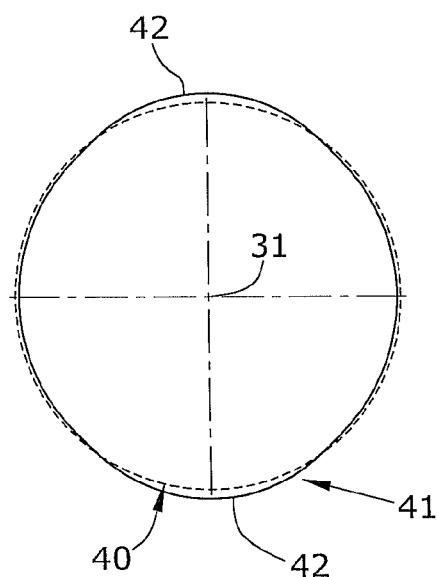
FIG. 8 is a view similar to FIG. 7 in case of a two-angled polygonal structure of the piston.
Figure 9:
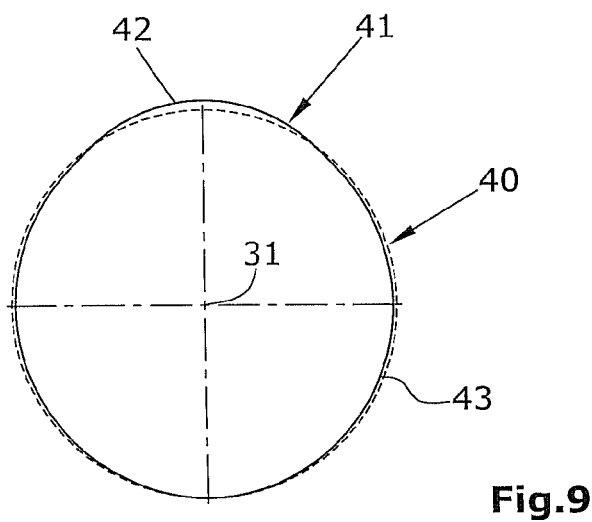
FIG. 9 is a view similar to FIG. 7 in case of a one-angled structure of the piston circumference.

While FIG. 7 shows a triangular polygonal structure, FIG. 8 shows an arrangement where a two-angled polygonal structure has been selected, with its two corners 42 arranged diametrically opposite each other. Also here, the unwound length of the non-circular wall portion is larger than the unwound length of the interior circle 40 of the cartridge. Illustrated in FIG. 6 is an embodiment of a structure with only one corner 42 in whose region the radius of the outer contour 41 is larger than the radius of the interior circle 40 of the cartridge. In this embodiment, the region 43 of the smaller radius extends along a large angular range of more than 270°.

Preferably, for the piston and the cartridge, the following rules apply:
a) The largest circumference of the circumferential wall portion according to claim 1 is larger than the circumference of the inner diameter of the cartridge. This means that the rear sealing region of the piston has to abut on the inner wall of the cartridge.
b) The radiant of the wall portion in the region of the largest radial distance is smaller than the inner radius of the cartridge.

The outer contour of the rear piston edge is not limited to the illustrated embodiments. It is also not necessarily required that this outer contour forms an equilateral polygon, although this feature does represent the preferred embodiment.

The cartridge piston can be made entirely or partially of polyamide or polyolefin, e.g. polyethylene or polypropylene. Especially preferred as a manufacturing material is polyethylene because this material is available in various degrees of stiffness or flexibility. Thus, using a soft polyethylene which is more flexible than the raw material normally used for cartridges, will advantageously allow for the desired abutment of the piston on the interior surface of the cartridge.

According to an embodiment of the invention which is not shown in the drawings, the surrounding rings 19 are formed as flexible lips and arranged on the non-circular wall portion. The flexible lips have the advantage of easily adapting to the round shape of the cartridge and thus abutting on the round cartridge wall already briefly after insertion of the cartridge piston into the cartridge.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A cartridge piston comprising a tubular piston body with a longitudinal central axis, said piston body having a surrounding side wall and being closed at its front end by a piston end face, said side wall being provided with at least one flexible sealing lip, wherein said side wall further comprises a surrounding wall portion whose radiant as defined relative to the longitudinal central axis is provided with variations in a circumferential direction when in a relaxed state and not subject to external forces, wherein said cartridge piston is insertable into a cartridge and an unwound length of the outer contour of the surrounding wall portion is slightly oversized relative to an unwound length of an interior circle of the cartridge, whereby at the end of an applying process, a displacement of material will have led to an equalization along the circumference of the piston, whereby the piston will throughout its circumference be in biased abutment on a wall of the cartridge.

2. The cartridge piston according to claim 1, wherein said non-circular wall portion resulting from the varying radiant is at least partially formed by a surrounding edge, said edge being arranged at a rear end of the side wall.

3. The cartridge piston according to claim 1, wherein said non-circular wall portion has a constant wall thickness in the circumferential direction.

4. The cartridge piston according to claim 1, wherein a protective edge which is relatively rigid in comparison to the sealing lip and comprises at least one cutout, is arranged in front of the sealing lip.

5. The cartridge piston according to claim 4, wherein a plurality of said cutouts are provided, said at least one flexible sealing lip having air passages and at least a part of said air passages being circumferentially offset relative to the cutouts.

6. The cartridge piston according to claim 1, wherein said at least one flexible sealing lip having air passages and said air passages are provided as non-beaded regions in a beaded edge at the end of the sealing lip.

7. The cartridge piston according to claim 1, wherein two flexible sealing lips project in opposite directions from a circumferential web of the side wall.

8. The cartridge piston according to claim 1, wherein said non-circular wall portion of the side wall has the shape of a polygon.

9. The cartridge piston according to claim 1, wherein the side wall comprises surrounding rings raised toward the outside, said raised surrounding rings preferably being formed as flexible lips.

10. The cartridge piston according to claim 9, wherein said raised surrounding rings are formed on the non-circular wall portion.

11. The cartridge piston according to claim 1, wherein the radiant (R), as defined relative to the longitudinal central axis, of the outer circumference of the non-circular edge of the piston is at certain sites larger and at other sites smaller than the radius of the inner circumference of the cartridge.

12. The cartridge piston according to claim 11, wherein air passages are formed between the end of the sealing lip and the cartridge wall.

13. The cartridge piston according to claim 1 wherein said at least one flexible sealing lip having air passages, and wherein a protective edge, being relatively rigid in comparison to the sealing lip, is provided in front of said at least one sealing lip, said protective edge at least partially covering said sealing lip and having cutouts which are at least partially arranged at a circumferential offset relative to the air passages of the sealing lip.

14. The cartridge piston according to claim 13, wherein said cutouts in their totality have a lower flow resistance than the totality of said air passages.

15. The cartridge piston according to claim 13, wherein said protective edge has a maximum diameter smaller than or equal to the maximum diameter of the sealing lip.

* * * * *